United States Patent [19]
Casey et al.

[11] Patent Number: 5,091,261
[45] Date of Patent: Feb. 25, 1992

[54] PAPERBOARD/POLYMER LAMINATE FOR BLISTER PACK

[75] Inventors: Harry B. Casey, Covington; Todd H. Huffman, Richmond, both of Va.; Debora F. Massouda, Silver Spring, Md.

[73] Assignee: Westvaco Corporation, New York, N.Y.

[21] Appl. No.: 509,586

[22] Filed: Apr. 16, 1990

[51] Int. Cl.$^5$ ............................................. B32B 23/08
[52] U.S. Cl. ................................. 428/511; 428/34.2; 428/537.5; 206/461
[58] Field of Search ............... 428/507, 537.5, 511, 428/34.2; 206/459, 461, 471

[56] References Cited

U.S. PATENT DOCUMENTS 3,734,798  5/1973  Dooley ............................ 428/498

FOREIGN PATENT DOCUMENTS 252712  1/1988  European Pat. Off. ............ 428/511
206547  2/1984  German Democratic Rep. ..................................... 428/511
111258  8/1980  Japan ................................. 428/34.2

Primary Examiner—Edith L. Buffalow

[57] ABSTRACT

A laminate for blister pack applications is comprised of a paperboard substrate having a first printable surface and a second surface onto which there is applied a polymeric coating suitable for adhering the plastic blister to the paperboard. The polymeric coating comprises a coextrusion consisting of a polyolefin material such as low density polyethylene (LDPE) which gives good adhesion to the paperboard surface and an adhesive material such as an ethylene-methyl acrylate copolymer (EMA) which gives good adhesion to the plastic blister.

12 Claims, 1 Drawing Sheet

PAPERBOARD/POLYMER LAMINATE FOR BLISTER PACK

BACKGROUND OF INVENTION

Blister card packages are commonly formed by adhering a rigid, preformed plastic blister or product holding capsule to an underlying support of paperboard or the like, with the product confined between them. The plastic blister is generally formed from a clear, moldable material such as polyvinyl chloride (PVC). In order to get the plastic blister to adhere to the paperboard, an adhesive coating must be applied to the surface of the paperboard where the blister is attached. There are a number of extrudable adhesive resins available which will adhere to PVC, but not all are readily adhered to paperboard.

Prior to the present invention, it was known in the art to use ethylene-methyl acrylate (EMA) as an adhesive coating for blister pack applications. EMA could be applied to paperboard using a conventional chill roll apparatus provided a chill roll release agent was used in the EMA. However, use of the chill roll release agent presented difficulty in getting the EMA to adhere to the paperboard. Removal of the chill roll release agent solved the product problem (adhesion of the EMA to the paperboard), but this created a production problem, i.e., adhesion of the EMA to the chill roll itself. Accordingly, the present invention was developed to overcome these prior art problems.

SUMMARY OF THE INVENTION

The present invention is directed to the preparation of a blister pack laminate comprising an adhesive layer, preferably ethylene-methyl acrylate (EMA), and a paperboard substrate, preferably clay coated paperboard. Paperboard with a clay coating on one surface is preferred for blister pack substrates because of its good printability. The method by which the product is prepared comprises coextruding EMA with a polyolefin, preferably low density polyethylene (LDPE), which adheres to both paperboard and EMA, onto a paperboard substrate. The EMA contains a chill roll release agent in a ratio of about 15 to 1 to achieve good release from the chill roll, while the LDPE securely bonds the EMA to the uncoated surface of the paperboard despite the presence of the chill roll release agent. The coextrusion may contain from about 3-7 lb. per ream of LDPE and from about 2-7 lb. per ream of EMA (ream size 3,000 square feet). The chill roll release agent is of a conventional type, and does not affect the adhesive capability of the EMA coating with the plastic blister. The paperboard/polymer laminate product in accordance with this invention is less costly than the prior art product since it requires a lower coat weight of EMA.

DETAILED DESCRIPTION

Figure 1:
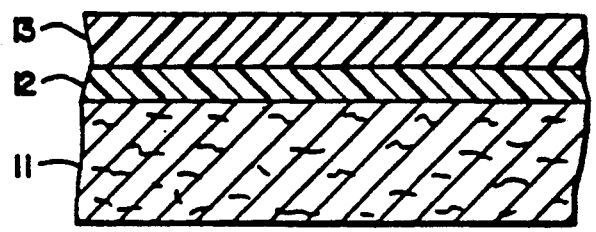

Referring to FIG. 1, a paperboard/polymer laminate is illustrated which comprises a paperboard layer 11, an extrudable polyolefin layer 12 and a plastic blister adhesive layer 13. Clay coated paperboard is preferred because of its good printability characteristics. Polyolefin layer 12 is an extrudable material which adheres to both the uncoated surface of the paperboard and the plastic blister adhesive material. Layer 12 preferably comprises low density polyethylene (LDPE) but may also comprise linear low density polyethylene (LLDPE), high density polyethylene (HDPE) and copolymers of polyethylene. The plastic blister adhesive material 13 is preferably ethylene-methyl acrylate (EMA), but may comprise ethylene vinyl acetate (EVA), ionomers (Surlyn) and acrylic copolymers. Because the adhesive layer 13 comes in contact with the chill roll during manufacture, it preferably includes a chill roll release agent in a ratio of about 15 to 1. The preferred chill roll release agent is of a conventional type and is sold under the tradename Ampacet Chill Roll Release MB 10451. Such release agents are typically long-chain alkyl derivatives. The EMA adhesive is available as an ethylene-methyl acrylate copolymer resin under the tradename Chevron PE 2205, and the LDPE is of a conventional type available from a number of manufacturers.

The coat weight of the LDPE and EMA layers is on the order of 3-7 lb. per ream, and 2-7 lb. per ream, respectively (ream size 3,000 square feet), but the thickness of the coating is not critical. By providing the coextrusion according to this invention, the EMA layer may be made thinner and lighter than EMA layers of the prior art because of the presence of the LDPE in the coextrusion. The product is also cheaper to manufacture because LDPE is less expensive than EMA.

Figure 2:
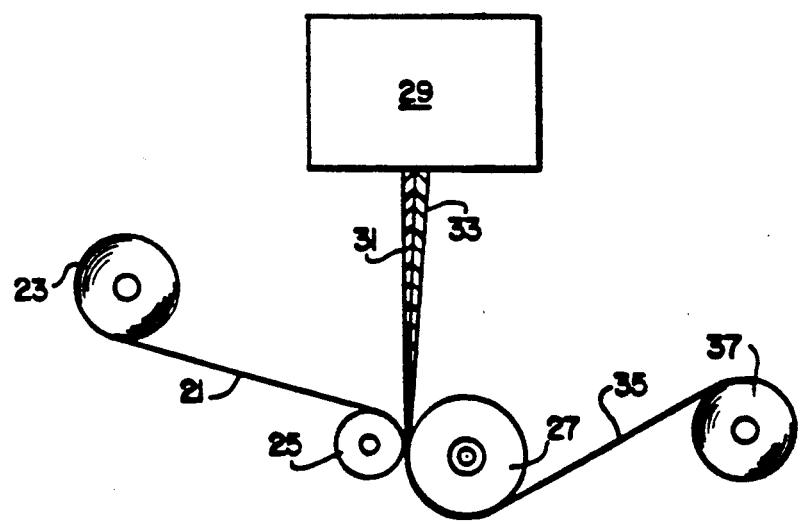

FIG. 2. diagrammatically illustrates the coextrusion process for producing the laminate of this invention. Paper board 21 is fed from feed roll 23 to pressure roll 25 and chill roll 27. Coextrusion apparatus 29 which comprises an internal combining die provides the polymer layer consisting of LDPE layer 31 and EMA layer 33. Suitable coextrusion apparatus is well known to those skilled in the art for carrying out this step.

The polymer layer is received on the paperboard 21 in the vicinity of pressure roll 25 with the paperboard contacting pressure roll 25 and the EMA layer contacting chill roll 27. The three layers are formed into a single laminate 35 at this point which is rewound onto take up roll 37. The resulting laminate typically comprises paperboard bearing in order, a layer of LDPE having a thickness of about 0.00035 inch, and a layer of EMA having thickness of about 0.00028 inch. The product can be die cut into substrates for blister packages in a conventional die cutting process.

Accordingly, although the invention has been described with particular reference to certain preferred embodiments, variations and modifications therein can be effected within the spirit and scope of the invention as defined in the appended claims.

What is claimed is:

1. A process for forming a paperboard/polymer laminate for use in the preparation of substrates for blister packs which comprises coextruding:
   (a) a first molten layer comprising a polyolefin selected from the group consisting of low density polyethylene, linear low density polyethylene, high density polyethylene and copolymers of polyethylene; and,
   (b) a second molten layer comprising a blister pack adhesive selected from the group consisting of ethylene-methyl acrylate, ethylene vinyl acetate, ionomers and acrylic copolymers onto a paperboard substrate in a single step to form a paperboard/polymer laminate, said polymer surface being the surface to which plastic blisters are adhered.

2. The process of claim 1 wherein said first layer has a coat weight of between about 3-7 lb. per ream.

3. The process of claim 2 wherein said second layer has a coat weight of between about 2-7 lb. per ream.

4. The process of claim 3 wherein said polyolefin is low density polyethylene (LDPE).

5. The process of claim 4 wherein said blister pack adhesive is ethylene-methyl acrylate copolymer resin (EMA).

6. The process of claim 5 wherein said EMA resin includes a chill release agent in the ratio of about 15 to 1.

7. A blister pack substrate constructed from a laminate comprising:
   (a) a paperboard layer having inner and outer surfaces;
   (b) a coextruded sandwich layer of polyolefin and blister pack adhesive permanently bound to the inner surface of the said paperboard layer said blister pack adhesive being exterior to said polyolefin; and,
   (c) a clay coating on the outer surface of said paperboard layer providing good printability.

8. The substrate of claim 7 wherein the polyolefin is at least about 0.00021 inch thick.

9. The substrate of claim 8 wherein the blister pack adhesive is at least about 0.00014 inch thick.

10. The substrate of claim 9 wherein the polyolefin is LDPE.

11. The substrate of claim 10 wherein the blister pack adhesive is EMA.

12. The substrate of claim 11 wherein the EMA includes a chill roll release agent in the ratio of about 15 to 1.

* * * * *